Dec. 19, 1967  A. M. MOEN  3,358,714
MIXING VALVE
Original Filed June 13, 1963  2 Sheets-Sheet 1
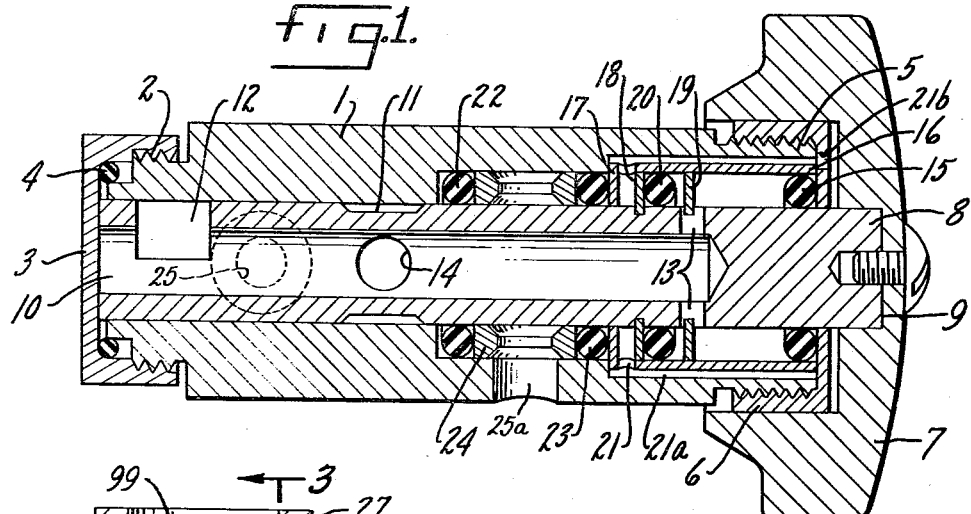
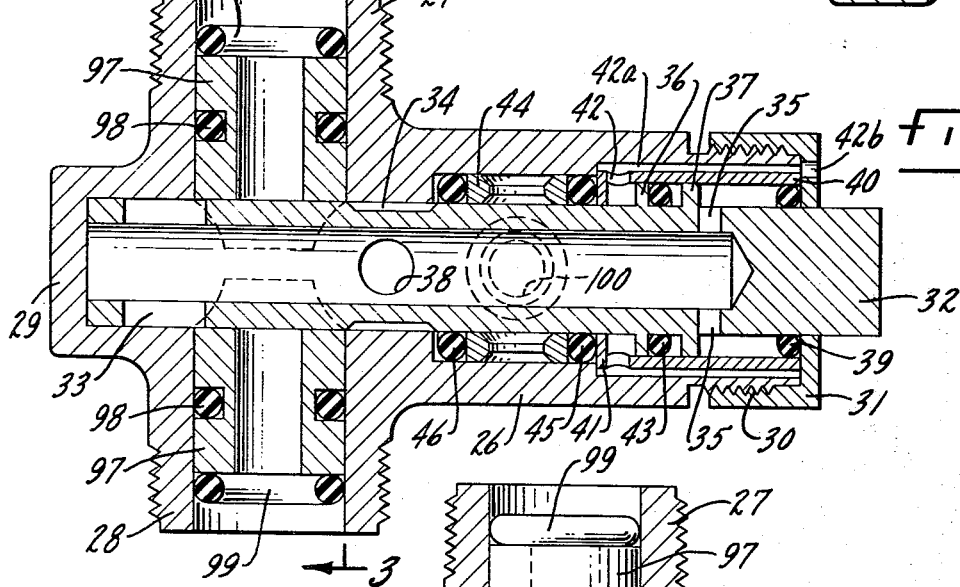
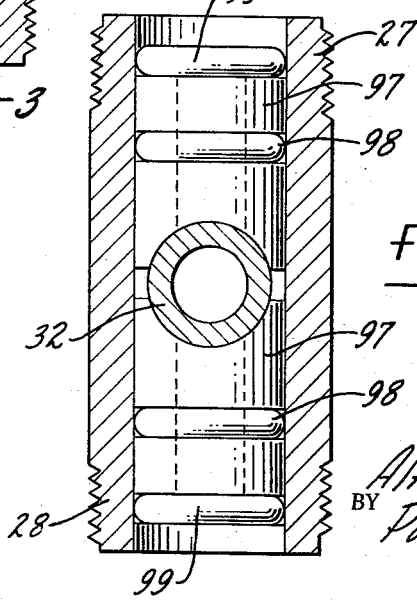
INVENTOR.
Alfred M. Moen,
BY Parker & Carter
Attorneys.

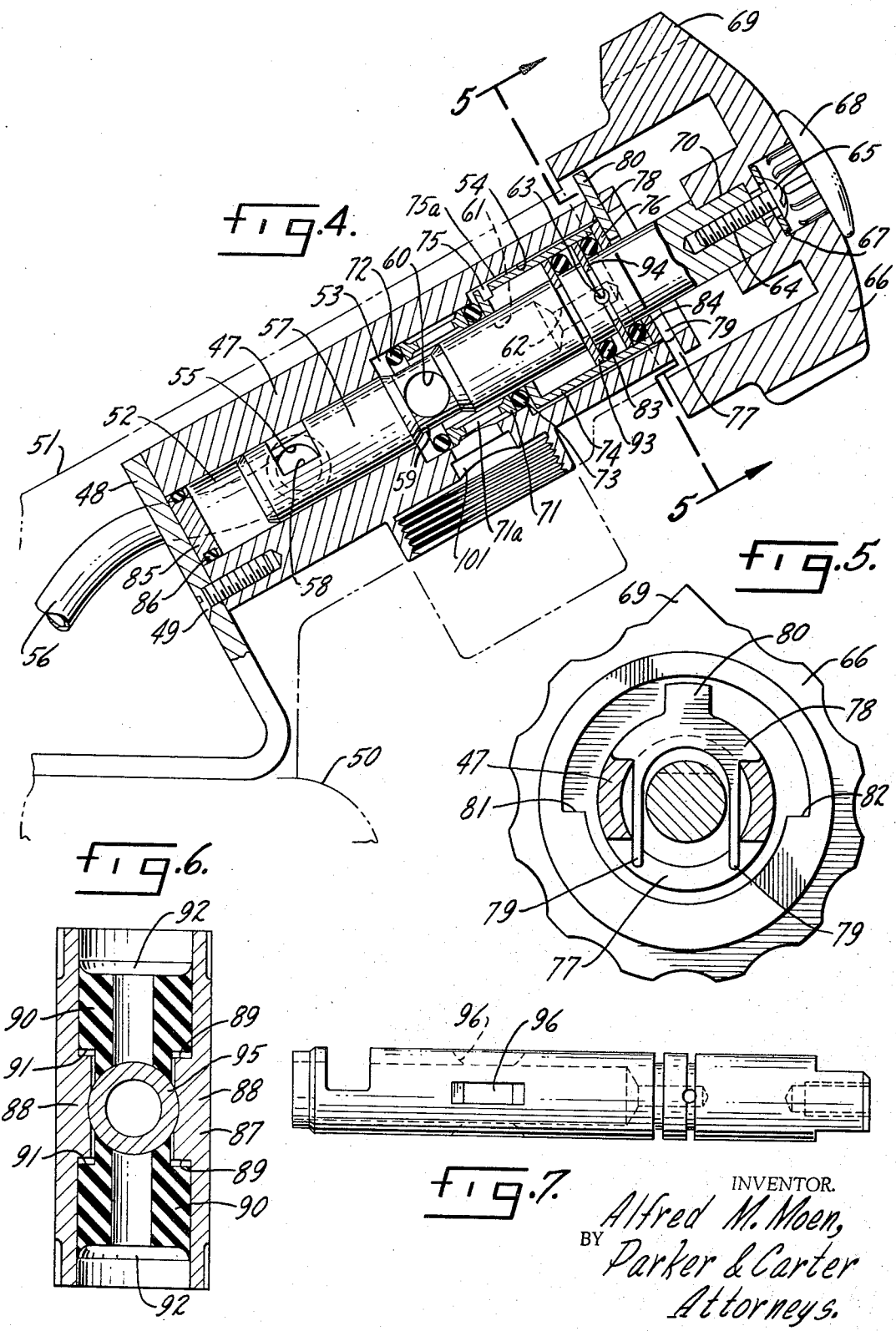

United States Patent Office 3,358,714
Patented Dec. 19, 1967

3,358,714
MIXING VALVE
Alfred M. Moen, 25 Lakeview Drive,
Grafton, Ohio 44044
Continuation of application Ser. No. 287,698, June 13, 1963. This application Oct. 8, 1965, Ser. No. 494,036
7 Claims. (Cl. 137—625.17)

This invention relates to valves and has particular relation to valves usable in connection with fluid supply systems including, for example faucets, and is a continuation-in-part of my copending application Ser. No. 743,404, filed June 20, 1958, now abandoned, and a continuation of my copending application Ser. No. 287,698, filed June 13, 1963, and now abandoned.

One purpose of the invention is to provide a valve of maximum simplicity in operation.

Another purpose is to provide a fluid mixing valve operable by reciprocatory movement.

Another purpose is to provide a push-pull mixing faucet.

Another purpose is to provide a mixing valve for faucets and the like having a minimum number of parts.

Another purpose is to provide a mixing valve for faucets and the like in which elements thereof have a dual function.

Another purpose is to provide a mixing valve in which the valve stem is pressure balanced in an axial direction.

Another purpose is a mixing valve of the type described including means for equalizing the water pressure on the valve stem to prevent accidental changing of its setting.

Another purpose is to provide a mixing valve with an improved seal for the valve stem water inlets.

Other purposes will appear from time to time during the course of the specification and claims.

The invention is illustrated more or less diagrammatically in the accompanying drawings wherein:

FIGURE 1 is a cross section illustrating one form of the invention,

FIGURE 2 is a cross sectional view illustrating a modification,

FIGURE 3 is a transverse section taken at line 3—3 of FIGURE 2,

FIGURE 4 is a longitudinal section of a further modified form of valve assembly, FIGURE 5 is a transverse section taken at line 5—5 of FIGURE 4, FIGURE 6 is a sectional view generally similar to FIGURE 5 but showing a modification in the packing means, and FIGURE 7 is an elevation of a modified form of valve stem.

Like parts are indicated by like numerals throughout the specification and drawings.

As shown in FIGURE 1 the housing or barrel member 1 is provided with a reduced threaded end 2 closed by a threaded cap 3. An O-ring 4 is provided to seal the cap. At its opposite end the barrel 1 is provided with a threaded reduced portion 5 which receives a threaded gland 6 carrying a head or handle portion 7. A stem or shaft 8 is received in a suitable depression 9 in the handle 7 and may be rotated or reciprocated by manipulation of the handle. The stem 8 is provided with a cylindrical cavity 10 which is open at the end opposite the handle, as shown. Its thickness is reduced as at 11 throughout its circumference. It is cut adjacent one end as at 12 and is provided adjacent its opposite end with perforations 13. It is also provided intermediate its ends with a plurality of perforations 14. Positioned about the stem or shaft 8 adjacent the handle 7 is an O-ring 15. This O-ring fits closely upon the stem and fits closely within the cylindrical member 16 which is itself secured to a ring 17 positioned about the stem. A pair of rings 18 and 19 are positioned within the cylindrical member 16 and engage suitable depressions or openings within the stem. An O-ring 20 is positioned between the snap rings. The chamber formed within the cylindrical member 16 is vented to the atmosphere through the hole 21 in the cylindrical member which connects with a cylindrical passage 21a, outside of the member 16. The passage 21a is connected to atmosphere through an opening 21b in the member 6.

A pair of additional O-rings 22 and 23 are positioned about the stem and between them is secured a perforated ring 24. A plurality of fluid or liquid inlets is provided and one of them is indicated in dotted lines, as at 25 in FIGURE 1. A discharge outlet is indicated at 25a.

The structure of FIGURE 2 generally resembles that of FIGURE 1 except for modifications in the housing or barrel. There is thus a member 26 which is provided with a cylindrical cavity of varying diameter. A pair of integral threaded members 27, 28 provide means for the inlet of fluid. The end of the barrel is closed by an integral closure 29. At its opposite end the barrel is provided with a threaded reduced portion 30 closed by a threaded gland 31. The stem 32 is generally similar to the stem of FIGURE 1. It is provided with openings 33 and it has an open end positioned away from the handle portion. It is reduced in outside diameter as at 34 to provide a groove. It is provided with two openings 35 adjacent the handle end. In lieu of the snap rings provided in FIGURE 1 it is provided with a pair of outwardly extending flanges 36, 37 and is provided with one or more openings 38 communicating with its reduced diameter 34.

Positioned adjacent the handle portion is an O-ring 39 which lies within the cylindrical member 40. This member is carried by a ring 41 and contains one or more perforations 42. The perforations 42 connect to atmosphere through a cylindrical passage 42a and an opening 42b in member 31. An O-ring 43 is positioned between the flanges 36 and 37. A perforated ring 44 is positioned about the hollow stem 32 and has on either side O-rings 45, 46.

Members 97 are sealing members, two of which appear in FIGURES 2 and 3. O-rings 98 are positioned in the exterior of these members and additional O-rings 99 are positioned at the ends of the members 97. They will be engaged by portions of the pipes or conduits connected to the faucet housing to conduct water to it. The entire unit consisting of the housing and value stem may be removed, for example by union nuts and replaced as a unit.

In FIGURE 4 a modified faucet construction is shown. It has, however, certain differences in detail which will be described below. 47 is the barrel or cylinder of the valve assembly. It may be received upon a support 48 and secured thereto by screws 49 or otherwise. As shown in dot-and-dash line, a base 50 may be present and an overall housing or enclosure 51, generally ornamental, may be secured to the base 50 and in position surrounding the faucet assembly. It is also indicated in FIGURE 4 in dot-and-dash line. The member 47 has formed within it a cylindrical chamber 52 which is enlarged, as at 53, and further enlarged, as at 54. An opening 55 is formed in the wall of member 47. It has an inlet opening for liquid and a conduit or pipe 56 is connected to the opening 55 and through it liquid or fluid to be controlled by the valve assembly enters the chamber 52. A second and preferably oppositely placed opening and conduit are positioned to supply to the mixing valve assembly a second liquid.

Generally, of course, hot water enters through one and cold water enters through the other. The second opening and conduit do not appear in FIGURE 4.

A valve stem 57 is mounted within the chamber 52 for rotation and reciprocation. It is notched or cut away as at 58. The stem is reduced in diameter as at 59 and is perforated as at 60. The stem 57 is provided with a cylindrical bore 61 which extends to the bottom of the valve stem and extends past the cut-away portion 58 and the perforation or perforations 60. This bore is reduced as at 62 and a perforation or passage 63 extends from the reduced bore to the outer surface of the valve stem to accomplish pressure balancing. At its outer end the valve stem is provided with a threaded perforation 64 within which a screw 65 is received. The screw holds a handle 66 in place upon the valve stem. If desired, a washer 67 may be positioned on or within a suitable depression in the handle. The depression in the handle is closed by a member 68, if desired. The handle 68 is preferably shaped, as shown in FIGURE 5, to provide a convenient non-slip gripping surface and it may include a pointer-like member or portion 69 which is so positioned that when the handle is in place upon the valve stem it will act as a pointer to indicate a neutral mixing position if desired. The valve stem may have a flattened portion 70 to fit with a correspondingly flattened portion or correspondingly shaped portion of the handle by means of which slipping of the handle with respect to the valve stem is prevented.

Within the enlarged portion 53 of the chamber formed within the valve housing or barrel 47 is positioned a ring 71. It is provided with perforations 71a as shown. At one end of the ring 71 is an O-ring or other packing 72. At the opposite end of the ring is provided an O-ring or packing 73.

Positioned within the enlarged chamber 54 is a cylindrical cup-like member 74 which has one or more openings 75 formed in it. The opening 75 communicates with the area outside of the member 74, indicated at 75a, with area 75a being connected to the atmosphere within the handle. It is closed at its inner end and is open at its outer end and is in contact at that end with a washer 76. The barrel 47 is slotted as at 77 and a key 78 fits within the slot. The key is shown in section in FIGURE 4 and in plan in FIGURE 5. As shown, it includes two prong-like members 79 and may have an outward extension 80. The extension 80 acts as a limiting member in cooperation with the shoulders 81 and 82 formed on or within the barrel of the handle 66.

Within the cup-like member 74 and engaging in suitable slots in the valve stem 57 are two snap rings 93 and 94. Between the rings there is positioned an O-ring 83 and between the ring 94 and the washer 76 there is positioned an O-ring 84.

In the particular form shown in FIGURE 4, the barrel 47 is open at the end which contacts the support 48. At that end it is provided with a closing plate 85 and sealing means 86, such as the O-ring shown in that figure.

In FIGURE 6, which shows a variant form of the sealing means shown in FIGURE 3, the portion 87 corresponds generally to the portion 27 of FIGURE 3. However, it is provided with a pair of oppositely placed, inwardly directed enlargements 88 between which the valve stem 95 is positioned. The enlargements form shoulders 89 and rubber or rubber-like sealing members 90 are positioned within the member 87. They are provided with shoulders 91 and are shaped to contact the stem 95. They may also be rounded or cup-shaped, as at 92, at their external ends.

The modified valve stem of FIGURE 7 is generally similar to the valve stem of FIGURE 4, except that it does not have the reduced portion 59. In view of this similarity, the same reference numerals are applied to corresponding parts in FIGURES 4 and 7. Instead of the reduced portion 59, the valve stem of FIGURE 7 has one or more generally radial cuts 96. These cuts may be formed by a rotary cutting element which will produce the somewhat tapered shape shown in FIGURE 7.

In the figures where parts are indicated as being joined together by screw-threading, the threads are shown in detail. In others of the figures, because of the small scale and to avoid confusion, the threads are not illustrated, as they would serve more to confuse than to illustrate.

The cylindrical member 26 has a discharge outlet 100 and the barrel or cylinder 47 has a discharge outlet 101. The discharge outlet from the valve assembly may lead to any desired point, for example, to a nozzle or spout.

One of the important features of the invention is the means for pressure balancing or pressure equalizing the valve stem. Without some means for balancing the water pressure on the valve stem, it would be difficult to maintain the stem in an appropriate position of adjustment. Considering FIGURE 1, water flowing through the hollow valve stem would be admitted through ports 13 into the chamber between O-rings 15 and 20, thus applying outward pressure to each. Pressure on O-ring 20, acting to the left in FIGURE 1, will force the O-ring up against the snap ring 18. Thus, the thrust of the water pressure is applied to the valve stem to bias it to the left. The O-ring itself prevents leakage, but the physical thrust of the water pressure is taken by the snap ring. Snap ring 19 takes no water pressure or thrust, but serves to position or maintain O-ring 20 at a particular point on the valve stem. It is important to note that the chamber on the left side of ring 18 in FIGURE 1 is at atmospheric pressure. If the stem were not pressure balanced it would move out of its set position as there would only be atmospheric pressure to resist this movement.

The thrust of the water pressure on O-ring 15, acting to the right in FIGURE 1, holds the O-ring against the inner portion in gland 6.

The water pressure, entering the inlet, is effective against the full face area of the valve stem to apply a thrust or bias to the right in FIGURE 1, this area being equal to the cross section of the valve stem. The area between the exterior of the valve stem and the interior of the sleeve or cylindrical member 16 is equal, or approximately equal, to the cross sectional area of the valve stem so that the water pressure creates equal and opposite forces on the valve stem, resulting in a pressure balance condition in all positions of the stem.

I have explained this in connection with FIGURE 1, but it should be understood that the same is true of other figures. For example, in FIGURE 2 flange 36 and O-ring 43 perform the same function as ring 18 and O-ring 20. In FIGURE 4 ring 93 and O-ring 83 perform this function.

The arrangement shown in FIGURES 1 and 4 with the washers 19 and 94 directly over the pressure balancing outlet ports 13 and 63 has the advantage that it is impossible to move O-rings 20 and 83 beyond ports 13 and 63. If the O-rings were so moved, the faucet would leak.

Of importance in the arrangement shown in FIGURE 6 is the positive seal applied to the valve stem when the faucet is in the off position. The cylindrical sealing means or rubber grommets 90 bear against valve stem 95 to provide a firm seal on the stem between the radial cuts 96 and the opening 58. The application of water pressure to the ends 92 is effective to compress the sealing members 90 firmly against the valve stem. The sealing members 90 are self-compensating for wear in that the application of water pressure will always push them against the valve stem even though the ends contacting the stem are worn. The shoulders 89 are important in that they hold the seal members 90 away from the stem a sufficient distance to permit easy insertion of the stem.

Although an operative form of the device has been shown, the invention is not limited to the particular details shown. Many changes may be made in the form, shape and arrangement of parts without departing from the spirit of the invention.

I claim:

1. In combination in a mixing faucet, a hollow housing, a plurality of inlets formed in the wall of said housing for the introduction of hot and cold water, an outlet therefrom to discharge mixed amounts of hot and cold water, a hollow valve stem positioned in said housing and a handle fixed thereto for rotation and reciprocation of the valve stem with respect to the housing, said valve stem having an inlet opening and an outlet opening, said inlet opening being adapted to be moved selectively into and out of register with one or more of said inlets to introduce hot and/or cold water into said hollow stem, said valve outlet opening being adapted to be moved into and out of communication with said outlet opening in said housing, packing means positioned within and in contact with said housing and with said valve stem, said valve stem including means, on the stem, defining a pressure area generally equal in size to the cross sectional area of the valve stem, said pressure area and cross sectional area of the valve stem providing equal and opposite fluid pressure areas in constant communication with equal fluid pressures independently of the position of said valve stem for equalizing the water pressure on said stem in both the open and closed position thereof.

2. The structure of claim 1 further characterized in that said packing means is positioned on each side of said valve stem outlet opening when said valve stem outlet opening is in register with said housing outlet.

3. The structure of claim 1 further characterized in that the means defining said pressure area includes a seal ring.

4. The structure of claim 1 further characterized by a passage connecting the interior of said stem with one side of said pressure area.

5. The structure of claim 3 further characterized in that said seal ring is between the outside of the stem and the inside of said hollow housing.

6. The structure of claim 1 further characterized in that one side of said pressure area receives water under pressure, and means connecting the other side of said pressure area to the atmosphere.

7. In combination in a mixing faucet, a hollow housing, a plurality of inlets formed in the wall of said housing for the introduction of hot and cold water, an outlet therefrom to discharge mixed amounts of hot and cold water, a hollow valve stem, closed at one end, positioned in said housing and a handle fixed thereto for rotation and reciprocation of the valve stem with respect to the housing, said valve stem having an inlet opening adjacent one end and an outlet opening intermediate its ends, said inlet opening being adapted to be moved selectively into and out of register with one or more of said inlets to introduce hot and/or cold water into said hollow stem, said valve outlet opening being adapted to be moved into and out of register with said outlet opening in said housing, packing means positioned within and in contact with said housing and with said valve stem and being located on each side of said valve stem outlet opening only when said valve stem outlet opening is in register with said opening in said housing, and means for equalizing the axially directed water pressure on said hollow valve stem including an outwardly extending annular projection, on the exterior of and movable with the valve stem, defining a pressure area generally equal in size to the cross sectional area of the valve stem, and means for supplying water to said pressure area.

References Cited

UNITED STATES PATENTS

| | | | |
|---|---|---|---|
| 2,924,243 | 2/1960 | Cordova | 137—625.17 |
| 2,943,792 | 7/1960 | Moen | 251—282 |
| 2,977,988 | 4/1961 | Drobilits et al. | 137—625.17 |
| 3,026,907 | 3/1962 | Klingler | 137—625.17 |

M. CARY NELSON, *Primary Examiner.*

W. C. CLINE, *Assistant Examiner.*